United States Patent
Guo et al.

(10) Patent No.: US 7,556,862 B2
(45) Date of Patent: Jul. 7, 2009

(54) PROTEIN BASED WOOD FINISHES AND METHODS FOR PRODUCING THE SAME

(75) Inventors: Mingruo Guo, South Burlington, VT (US); Nareen Wright, Washington, DC (US); Jiancai Li, South Burlington, VT (US)

(73) Assignee: The University of Vermont and State Agricultural College, Burlington, VT (US)

( * ) Notice: Subject to any disclaimer, the term of this patent is extended or adjusted under 35 U.S.C. 154(b) by 326 days.

(21) Appl. No.: 11/037,817

(22) Filed: Jan. 18, 2005

(65) Prior Publication Data

US 2005/0203219 A1 Sep. 15, 2005

Related U.S. Application Data

(63) Continuation-in-part of application No. PCT/US03/22378, filed on Jul. 18, 2003.

(60) Provisional application No. 60/397,460, filed on Jul. 19, 2002.

(51) Int. Cl.
  *B32B 29/00* (2006.01)
(52) U.S. Cl. ........................ 428/532; 428/535; 428/536; 428/537.1; 427/325; 427/338; 427/384; 427/393
(58) Field of Classification Search ................ 428/532, 428/535, 536, 537.1; 427/325, 338, 384, 427/393
See application file for complete search history.

(56) References Cited

U.S. PATENT DOCUMENTS

| | | | |
|---|---|---|---|
| 4,582,719 A * | 4/1986 | Kaetsu et al. | 514/773 |
| 5,476,636 A | 12/1995 | Tommiita et al. | |
| 5,476,686 A | 12/1995 | Fritz | |
| 6,497,921 B1 * | 12/2002 | Carbonell et al. | 427/430.1 |
| 6,652,920 B2 * | 11/2003 | Carbonell et al. | 427/430.1 |
| 6,709,472 B1 * | 3/2004 | Ferretti et al. | 44/553 |

FOREIGN PATENT DOCUMENTS

| | | | |
|---|---|---|---|
| EP | 0960922 A1 | | 12/1999 |
| EP | 0960922 A1 | * | 12/1999 |
| EP | 1 067 160 A1 | | 1/2001 |
| WO | WO 96/12058 A1 | | 4/1996 |
| WO | WO 2004/009252 A2 | | 1/2004 |

OTHER PUBLICATIONS

Bolin, H.R. and Huxsoll, C.C. Control of Minimally Processed Carrot (*Daucus carota*) Surface Discoloration Caused by Abrasion Peeling. J. Food Sci. 56: 416-418, 1991.
McHugh, T.H. et al., Hydrophilic Edible Films: Modified Procedure for Water Vapor Permeability and Explanation of Thickness Effects. J. Food Sci. 58: 899-903, 1993.
Bhattacharyya et al., Molecular chaperone-like properties of an unfolded protein, alpha(s)-casein, J Biol Chem. May 28, 1999;274(22):15505-9.
Guo et al., Susceptibility of beta-lactoglobulin and sodium caseinate to proteolysis by pepsin and trypsin. J Dairy Sci. Nov. 1995;78(11):2336-44.
Wright et al., Microstructural and mold resistant properties of environment-friendly oil-modified polyurethane based wood-finish products containing polymerized whey proteins. Journal of Applied Polymer Science. 2006;100:3519-3530.

* cited by examiner

*Primary Examiner*—Leszek Kiliman
(74) *Attorney, Agent, or Firm*—Wolf, Greenfield & Sacks, P.C.

(57) ABSTRACT

Wood finishes and methods of production and application of wood finishes are provided. The finishes may contain biologically produced components, such as proteins, and specifically may include whey proteins derived from dairy processing. The wood finishes are environmentally friendly as they use reduced levels of solvents and provide a safe and protective coating for wood and wood products.

44 Claims, 2 Drawing Sheets

PROTEIN BASED WOOD FINISHES AND METHODS FOR PRODUCING THE SAME

RELATED APPLICATIONS

This application is a continuation-in-part of PCT Application No. US03/22378, filed Jul. 18, 2003 and claims benefit of U.S. Provisional Application No. 60/397,460, filed Jul. 19, 2002.

GOVERNMENT SUPPORT

This invention was made with government support under the VT-NS-029SG and VT-NS-033SG awarded by the US.S. Department of Agriculture Cooperative State Research, Education and Extension Service. The government has certain rights in the invention.

FIELD OF THE INVENTION

The invention relates to wood finishes containing naturally occurring products and, more specifically, to wood finishes containing proteins.

BACKGROUND OF INVENTION

A variety of finishes can be used to coat wood products such as furniture, toys, flooring, buildings, and house trim. Typically, these finishes are based on binder resins such as acrylate or urethane based resins, and include volatile organic carbon (VOC) solvents. These formulations allow the resins to form a protective film after evaporation of the solvents. The solvents, however, may be toxic to those applying the finishes. Toxicity is also a concern to those who may be exposed to the finished product, particularly young children who may place toys or furniture in their mouths.

The dairy industry produces large amounts of whey as a byproduct in the production of cheese and other dairy products. Whey can include protein, fats, and carbohydrates such as lactose. Uses for this whey are limited and typically the whey is disposed of. This disposal can lead to significant environmental problems due to the increase in biological oxygen demand (BOD) released into the environment when the whey is disposed of.

Some limited uses for whey have been developed. For example, whey proteins can be used in photographic emulsions, and a saponified whey protein, at an elevated pH, can be used to protect the lignin component of wood shavings from attack by pests. The wood shavings can then be used as heat insulation in construction (U.S. Pat. No. 5,476,636). The saponified whey is allowed to penetrate the wood shavings and it is believed that the high pH preserves the wood chips from biological attack. The whey, which contains protein, fat and lactose, is saponified with an alkali and is then allowed to soak into wood shavings that can be preserved and then used as insulation material.

SUMMARY OF THE INVENTION

Wood finishes and methods of producing and using wood finishes are provided.

In one aspect, a wood finish is provided. The wood finish comprises protein.

In another aspect, a wood finish solution is provided, the wood finish solution comprising at least 1.5%, by weight, of protein and a resin.

In another aspect, a method is provided in which a wood finish solution is produced by denaturing a protein to produce a denatured protein and mixing the denatured protein with water and a resin to produce a wood finish solution.

In another aspect, a method is provided, the method comprising applying a wood finish solution to a wooden substrate wherein the wood finish solution comprises protein.

In another aspect, a kit is provided wherein the kit includes a container of wood finish solution and instructions for applying the wood finish solution and wherein the wood finish solution comprises a protein.

Other aspects, embodiments, and features of the invention will become apparent from the following detailed description. All references incorporated herein are incorporated in their entirety. In cases of conflict between an incorporated reference and the present specification, the present specification shall control.

DETAILED DESCRIPTION

A wood finish is provided that incorporates proteins into the finish. The wood finish may provide a coating that is protective, water-resistant, hard, resistant to scratching, and environmentally friendly.

In one aspect, a variety of proteins may be incorporated into a wood finish solution and a wood finish. As used herein, a "wood finish" is a dry, smooth, hard film on the surface of a wood product such as furniture, toys, buildings and finished carpentry. Wood finishes can be used to protect or to improve the appearance of wood. Wood finishes include, for example, stains, paints, sealers, varnishes, shellacs, conditioners, polyurethanes, lacquers and coatings. The film of a wood finish is typically greater than 5 µm thick and is often 10-40 µm thick when applied to wood products. The film can be clear and colorless or may be opaque and/or tinted and may be used to protect wood from the effects of exposure to the elements. Some wood finishes (clear finishes) may allow the wood grain to be apparent through the finish while others, such as paints, may hide the wood grain. A wood finish can also improve the appearance of a wood substrate by, for example, providing an even sheen to the surface of the wood. A "wood finish solution" is a liquid solution, emulsion, suspension mixture or other flowable liquid that can be applied to a wood product and result in a wood finish after curing.

A number of biological compounds can be incorporated into a wood finish. These compounds include polysaccharides such as cellulose and starches, gums, proteins including collagen, gelatin, soy protein, wheat gluten, cornzein, casein, sodium caseinate, egg albumen, and others. In one embodiment, a protein (or proteins) obtained from dairy whey may be used. The whey protein may be used as a powder or in a solution, such as an aqueous solution. The whey protein may be a whey protein concentrate (WPC) or a whey protein isolate (WPI) and may be denatured. Denaturing may be achieved by methods known to those skilled in the art, such as by thermally denaturing.

The protein component, or components, of the wood finish may be incorporated into the wood finish solution formulation in quantities of from 1 to greater than 60%, by weight, of the solution, and preferably is used in quantities greater than or equal to 10%, 20%, 30%, 40% or 50%, by weight, of the wood finish solution.

As whey proteins are available in large quantities and have historically presented a disposal problem, embodiments that employ whey proteins are of particular interest to both the wood finish and the dairy industries. In the United States alone, over $3.97 \times 10^{10}$ pounds of sweet whey (pH greater than 5.6) and $3.75 \times 10^9$ pounds of acid whey (pH less than 5.1) are produced per year. Sweet whey generally results from rennet-coagulated cheese manufacture while the bulk of the acid whey produced comes from the production of cottage cheese. The quantities produced, in combination with the high biological oxygen demand (BOD) of the whey, provide important opportunities for processes that can use acid whey, sweet whey or both.

In addition to making use of a substance that is typically a waste product, the incorporation of whey protein into a wood finish solution can provide for an improved wood finish, as well as improved methods of production and application. When compared to equivalent wood finishes that do not contain whey protein, a whey protein based wood finish can have, for example, increased density, viscosity, reduced VOC content, a harder and more scratch resistant film, better water resistance, low toxicity, low cost and is amenable to the inclusion of a variety of additives that can be used to alter the aspects of both the wood finish solution and the wood finish. In one embodiment, the protein component of a wood finish solution may consist partially or totally of protein derived from whey. The protein may consist essentially of whey protein.

In one embodiment, whey protein isolate (WPI) is used at a purity of greater than 90% protein in order to provide for a more durable and clearer finish. Preferably, the purity of the whey protein isolate is greater than 95, greater than 98 or greater than 99% protein. As raw whey contains fats and carbohydrates as well as other contaminates, it is preferred that these components be removed from the whey protein to produce the WPI prior to its incorporation into a wood finish solution. These materials can be isolated by methods known to those skilled in the art such as membrane filtration and ion exchange.

The use of whey proteins in a wood finish solution can provide a solution having a viscosity of up to 1000 mPa-s. The increased viscosity of a wood finish solution can provide for easier application to a surface resulting in a protective finish of desired thickness on wood products such as furniture, toys and carpentry. Whey proteins can be added to finishes to arrive at viscosities of greater than 20, greater than 50, greater than 100, greater than 200, greater than 400, or greater than 500 mPa-s. This can eliminate the need for the addition of thickeners and other additives that can increase cost and can affect the performance of the final finish. Of course, if viscosity is too high, the finish solution cannot be easily applied and may not result in a preferred finish.

In another embodiment, a wood finish solution exhibits lower VOC emissions than many commercially available wood finish solutions. The addition or substitution of protein to synthetic resin formulations, preferably as an aqueous solution of whey protein, can provide a wood finish solution requiring, for example, 50%, 75%, or 90% less organic solvent, while maintaining or improving the properties of the solution and the resultant finish. For example while many commercially available acrylic and urethane based finishes contain VOCs in a range of from 250 to 450 g/l, the use of a whey protein in a similar wood finish formulation can reduce the VOC content to less than a 100 g/L, less than 80 g/L, less than 60 g/L. Importantly, this reduction can be achieved while maintaining or improving other characteristics of the wood finish and wood finish solution. For example, this can provide for a safer environment for those applying the wood finish, can reduce the quantity of the solvents being emitted to the atmosphere, can reduce the flammability of the wood finish solution and can also reduce the cost of the product by decreasing the total amount of VOCs required to manufacture it. At the same time, improvements in appearance and durability of the finish can be realized.

The pH of a wood finish solution may be varied by substituting or replacing components with a protein. For example, wood finish solutions including proteins may have a pH of less than 9, less than 8, less than 7 or less than 6. In one embodiment, the pH of the wood finish solution may be between 6 and 7.

Whey protein can be used to supplement or replace currently used resins in wood finish coatings. The whey protein can be added to any waterborne, resin based wood finish formulation including acrylic and urethane based resins. Preferably, the whey proteins are used in conjunction with either acrylic or urethane based resins and interact with these resins to form a durable finish. By substituting whey protein for a portion of a synthetic resin, the amount of synthetic resin used in the wood finish solution can be reduced from 70% by weight down to 30, 20, 10% or less in some embodiments. Preferably, the amount of synthetic resin used is from 40-70% by weight of the finish solution. Most preferably, the synthetic resin content is from 45-60% by weight. The protein component of the solution preferably forms from 10-60%, by weight, of the solution and more preferably is from 10-40% of the solution. The ratio of whey protein to resin used in a wood finish solution can be, by weight, from 1:10, or less, up to 1:1, or greater. Most preferred are ratios of from about 1:2 to 1:4. Specific ratios of whey protein to synthetic resin can be tuned to maximize specific properties such as hardness, color, adhesiveness, ease of application, cost and water resistance.

Whey proteins can be pretreated in a number of ways prior to their incorporation into a wood finish solution. For example, a whey protein isolate (WPI) can be formed from a raw whey product. Some naturally occurring components of whey can be reduced or removed to form the WPI. A WPI may be made from either a sweet or an acid whey and may contain less than 5, less than 4, less than 3, less than 2 or less than 1% fat as well as less than 5, less than 4, less than 3, less than 2 or less than 1% carbohydrates.

Raw whey contains a number of components including proteins, lactose, minerals and lipids. The protein fraction can be separated from the other components by techniques known to those skilled in the art such as a stirred tank or a packed column ion exchange. These methods can be used to isolate the whey protein (primarily beta-lactoglobulin, alpha-lactalbumin, bovine serum albumin, immunoglobulin G, and proteose-peptones) from the other components. Once separated from the impurities such as carbohydrates, minerals and lipids, the protein fraction can be dried into a powder providing greater than 90% protein with the remainder being moisture.

Purification techniques may include membrane separation and ion exchange, with ion exchange typically capable of producing a protein of higher purity. Typical membrane separation techniques such as ultra filtration and diafiltration use semi-permeable membranes to separate components having molecular weights of less than 50 kDa. The resulting protein product, typically at a purity of less than 90%, is referred to as whey protein concentrate (WPC). Alternatively, ion exchange methods known to those skilled in the art can produce a protein powder having a purity of greater than 90% that is generally referred to as whey protein isolate (WPI).

Protein fractions such as WPI and WPC can be denatured prior to their use in a wood finish solution. Denaturing can unfold globular whey proteins and results in the polymerization of the whey proteins, by disulfide crosslinking, within a protein molecule and across protein molecules. It is believed that this disulfide crosslinking is important in producing strong, resistant protein films that help to achieve the attributes that make a favorable wood finish.

Denaturing can be achieved by thermally treating protein or a protein solution, such as a WPI solution. Denaturing results in an increase in viscosity of the solution and it is preferred that the protein content be kept below about 15%, by weight, to prevent gelation that can result from the denaturing process. Thermal denaturing can be efficiently achieved using a 10% by weight aqueous protein solution at a pH of 7 and exposing the solution to a temperature of 90° C. for about 30 minutes.

Although protein fractions such as WPI and WPC can be dispersed directly into a cold-treated water mixing tank, they may, under some conditions, be difficult to uniformly disperse in water. Therefore, the following procedure has been developed to aid in dispersion. The protein component, for example WPI, is added to a one-to-one mixture of ice and water that has been previously ground in a blender. The protein and ice water are then ground in the blender for about 15 seconds after which the solution is manually mixed for 30 seconds and followed by an additional 15 seconds of blending. Finally, the solution is mechanically stirred using an electric motor driven propeller for about 8 minutes to result in a uniform protein solution. This uniform protein solution can then be denatured, for example, by thermally treating as described above, and then can be stored or immediately incorporated into a wood finish solution. When compounding a wood finish solution, the protein component can be added as a dry powder or in the form of a solution. Typically, the protein content of a wood finish solution will be referred to by the percent of the total solids in the solution that comprises protein or the percent of the total solution that comprises protein.

Wood finishes incorporating 10, 20, 30 or 40% WPI by weight exhibit gouge and scratch resistance comparable or superior to that of commercially available products such as polyacrylic, polyurethane and acrylic polyurethane finishes. In addition, puncture strength, water vapor permeability and general water resistance of the finishes incorporating WPI are also comparable or superior to that of the commercially available finishes. For example, when cured finishes are evaluated using ASTM D3363 for scratch hardness, hardness ratings of B, HB, or better, can be obtained. This compares favorably to scratch hardnesses of 4B and 2B for commercially available acrylic and polyurethane based finishes.

In addition, clear finishes incorporating WPI may recover from water whitening at a faster rate than equivalent finishes that don't incorporate WPI. When tested using ASTM D 1647, tinplate panels coated with WPI-based finishes recovered original clarity at a rate that was faster than, or equivalent to, recovery rates measured for identical panels treated with similar finishes that did not incorporate WPI.

Wood finish solutions incorporating a whey protein such as a WPI are also compatible with other additives including biocides, mar resistant additives, UV additives, flattening agents, plasticizers, anti-setting agents, anti-floating agents, leveling agents, glossing, flatting, penetrating, wetting and stabilizing agents. Generally, any additives that can be used with waterborne formulations can also be used with the wood finish solutions disclosed herein.

Biocides can be added to protect a wood finish solution from spoilage by bacteria, yeast, and fungi. Biocides may form less than 1%, by weight, of the solution and preferably are present in the range of about 0.01 to 0.5% of the solution. Specific biocides that have been shown to be useful include 1,2-benzisothiazolin-3-one(BIT)-based biocides such as PROXEL® brand biocides available from Aveceia Inc. In addition, DOWICIL® brand biocides available from Dow Chemical, Polyphase® brand biocides from Troy Corporation and Busan® brand biocides from Buckman Laboratories can also be effective in protecting the finish solution from attack by a broad spectrum of yeast, bacteria, and fungi.

Mar resistant agents can be used with a whey protein wood finish solution in order to increase attributes such as hardness, scratch resistance and durability of the finish. These agents can be used in a variety of concentrations, for example, at 0.5%, 0.3% or 0.1% and specific mar resistant agents such as BYK 301 have been shown to be compatible with the WPI based wood finish solutions.

Additional additives known to those skilled in the art, such as UV additives, leveling agents, and stabilizing agents can be used in applications that call for the attributes of these additives.

The wood finish solutions disclosed herein can be made using any variety of techniques know to those skilled in the art. For example, using a conventional stirring apparatus, components may be added in any order. Process control agents, such as defoamers and coalescers may be added first. Defoamers may be used at any required concentration and are generally added in the range of less than about 0.5%, by weight of the solution. For example, a batch may be started by adding a defoamer such as Dehydran® 1293, available from Fitz Chem Corporation, to an acrylic resin system. Water can then be added to the system followed by the addition of a thermally denatured WPI solution, to, for example, a level of 10% protein, which can then be followed by the addition of coalescing solvents such as Dowanol™ PnD™ and/or Dowanol™ DPnB™ solvent systems, available from Dow Chemical Corporation. Coalescing solvents may be added at a concentration adequate to achieve the desired coalescing effect and are preferably used at a concentration of about 0-5%, of the solution, by weight. After the components are thoroughly mixed, the solution can be stored, packaged, or can be used immediately.

Alternative preparation techniques include starting with available finished solutions such as acrylic based mixes and adding thermally denatured WPI solution to the mixture to arrive at the final desired formulation, such as a 10% protein, by weight, solution. Thus, a WPI solution can be added at any time in the mixing process to obtain the desired wood finish formulation. The wood finish solution formulations may be stored in cans or drums to eliminate exposure to air and for extended storage of the finish solutions it is preferred that a biocide be added to the solution to inhibit microbial activity.

The wood finish solutions can be applied to a surface using any number of techniques known to those skilled in the art. For example, solutions may be applied by brush, by spraying or by dipping, and the technique employed can be determined by one skilled in the art after evaluating the product being coated as well as the characteristics of the finish solution being used. In some applications, additional coats of the finish solution may be desired, and improved adhesion and appearance of later coats can be aided by light sanding of previously applied layers. Finishes can be applied using one or more coats per article being coated. Wood substrates can be treated prior to finishing by using techniques known to those skilled in the art, such as staining, sealing and sanding.

After application to a substrate such as furniture, toys or finished carpentry, the finish may be formed (dry film) by allowing the finish solution to air dry at room temperature. Alternatively, the curing process may be accelerated, for example, by applying heat to the surface. As the use of whey protein in a finish solution can allow for a higher solid loading of the finish solution, drying can proceed at a faster rate with the emission of fewer volatiles when compared to commercially available coatings based on, for example, acrylic or polyurethane based resins. This increased solids loading can be obtained using whey protein without adversely affecting the important properties of the finish solution, such as viscosity, flattening, or color. Thus, in addition to improving many characteristics of the commercially available products, the addition of whey protein to a wood finish solution can allow for increased finish coverage of a wood product, at an equivalent film thickness, for an equivalent volume of wood finish solution.

In another embodiment, a kit is provided. The kit may include a container, such as a can or bottle, containing a wood finish solution. The kit may also include instructions for the application of the wood finish solution to a wood substrate. The kit may also include information about the composition of the wood finish solution and may specifically include information stating that the solution contains protein, such as whey protein. Clean-up and disposal instructions may also be provided. The kit may be offered for sale in stores such as hardware, department and specialty stores.

It should be understood that not all of the above-identified advantages may be achieved in all embodiments of the present invention. The present invention will be further illustrated by the following examples, which are intended to be illustrative in nature and are not to be considered as limiting the scope of the invention.

EXAMPLE 1

In this example, two wood finish formulations were manufactured to show the applicability and usefulness of wood finish formulations incorporating WPI. In the first example, components of which are shown in Table 1, the amount of WPI solution, containing 10% protein, was varied between about 12 and 53% by weight of the wood finish solution. In the second example, the components of which are shown in Table 2, a different acrylic resin was used and the same WPI solution containing 10% protein was varied between 28 and 42%, by weight, of the wood finish solution. The WPI used was ALACEN® 895, 93.5% protein, from NZMP (North America) Inc., Santa Rosa, Calif. A 10% protein solution in water was made (100 g ALACEN® 895 per 935 mL of solution) and was denatured by heating at 90° C. for 30 minutes. The acrylic resins used in these examples were NeoCryl® A-634, an aqueous acrylic copolymer and NeoCryl® XK-12, a self cross-linking modified acrylic emulsion. Both of these acrylic-based resins are available from NeoResins, Wilmington, Mass.

Each of the examples was produced by first adding a defoamer, either Patcote™ 525 (Table 1) or Dehydran™ 1293 (Table 2) to the acrylic resin system and then adding, in order, water, the thermally denatured WPI solution, coalescing solvents (for the examples using the solvents) such as Dowanol® PnB and Dowanol® DPnB and then adding other additives such as biocides (PROXEL® GXL), a mar-resisting agent (BYK™ 301), a wetting agent (BYK™ 348) and/or a flow and mar resistant agent (BYK™ 307). As the WPI was added as a 10% aqueous protein solution, additional water was obtained through the addition of this component. Each of the formulations listed in Tables 1 and 2 was successfully coated onto a wood surface illustrating the concentration range of WPI that can be used to make an exceptional wood finish solution.

TABLE 1

| | Ingredients (% weight) | | | | | |
|---|---|---|---|---|---|---|
| Example | NeoCryl A-634 | Patcote 525 | Water | WPI, 10% Pro | BYK 301 | PROXEL GXL |
| 1 | 65.71 | 0.4 | 21.54 | 12.0 | 0.3 | 0.05 |
| 2 | 62.25 | 0.4 | 13.0 | 24.0 | 0.3 | 0.05 |
| 3 | 60.17 | 0.4 | 7.88 | 31.2 | 0.3 | 0.05 |
| 4 | 58.79 | 0.4 | 4.46 | 36.0 | 0.3 | 0.05 |
| 5 | 46.02 | 0.4 | 0.0 | 53.23 | 0.3 | 0.05 |

TABLE 2

| | Ingredients (% weight) | | | | | | | | |
|---|---|---|---|---|---|---|---|---|---|
| Example | NeoCryl XK-12 | Water | Dehydran 1293 | WPI, 10% Pro | BYK 348 | BYK 307 | Proxel GXL | Dowanol PnB | Dowanol DPnB |
| 6 | 56.00 | 15.05 | 0.5 | 28.0 | 0.25 | 0.15 | 0.05 | 0 | 0 |
| 7 | 55.56 | 13.49 | 0.5 | 30.0 | 0.25 | 0.15 | 0.05 | 0 | 0 |
| 8 | 55.56 | 9.93 | 0.5 | 30.0 | 0.25 | 0.15 | 0.05 | 1.78 | 1.78 |
| 9 | 52.89 | 4.16 | 0.5 | 42.0 | 0.25 | 0.15 | 0.05 | 0 | 0 |

Table 3 provides the trade names of many of the components used to produce examples of Tables 1 and 2 and also provides a description of the component's function, and the manufacturer from whom it is available.

TABLE 3

| Ingredient | Primary Function | Manufacturer |
|---|---|---|
| NeoCryl ® A-634 | Aqueous acrylic copolymer. As a binder. | NeoResins |
| NeoCryl ® XK-12 | A self-crosslinking modified acrylic emulsion. As a binder. | NeoResins |
| WPI, 10% protein | Thermally denatured (90° C., 30 min) aqueous WPI solution. As a binder. | NZMP (North America) Inc. |
| Patcote ® 525 | Defoamer | American Ingredients Company |
| BYK 301 | Mar-resistant agent | BYK-Chemie Inc. |
| PROXEL ® GXL | Biocide | Avecia Inc. |
| Dehydran ® 1293 | Defoamer | Fitz Chem Corp. |
| BYK ™ 348 | Wetting agent | BYK-Chemie Inc. |

TABLE 3-continued

| Ingredient | Primary Function | Manufacturer |
|---|---|---|
| BYK ™ 307 | Flow/mar aid | BYK-Chemie Inc. |
| Dowanol ® PnB | Coalescing solvent | Dow Chemical Co. |
| Dowanol ® DPnB | Coalescing solvent | Dow Chemical Co. |
| Water | Solvent | — |

EXAMPLE 2

Additional finish formulations were made using the same method as in Example 1 to obtain whey protein levels of 10% of solids, 15% of solids and 25% of solids, by weight, in the wood finish solution formulations. Each of the whey formulations used the NeoCryl® A-634 acrylic resin of Example 1 as a binder. The formulations were coated onto surfaces and compared to four commercially available wood finishes, C1, C2, C3 and C4, as well as to the acrylic-based formulation absent the addition of whey protein. The three whey-based formulations F1, F2 and F3, that were tested, are provided in Table 4 below with the base acrylic coating formulation, F0, being equivalent to that used in the examples of Table 1 except that no whey protein was used in the formulation designated F0.

TABLE 4

| Product Code | Description |
|---|---|
| F0 | Acrylic-based coating formulation adopted from literature with little modification, 0% protein of total solids |
| F1 | WPI-Acrylic coating formulation, 10% protein (of total solids) |
| F2 | WPI-Acrylic coating formulation, 15% protein (of total solids) |
| F3 | WPI-Acrylic coating formulation, 25% protein (of total solids) |
| C1 | Commercial Minwax ® polyacrylic protective finish, clear gloss. |
| C2 | Commercial Benwood ® Stays Clear ® acrylic polyurethane, hi-gloss 422 |
| C3 | Commercial Cabot ® water-based polyurethane varnish, 2203 gloss |
| C4 | Commercial BEHR ® No. 630 water-based polyurethane, clear hi-gloss |

Selected properties of the wood finish solutions were measured and are provided in Table 5. The data show that the pH of the acrylic based coating formulation is significantly lower than that of the commercially available products and that as the protein content of the wood finish solution is increased, the pH of this solution also increases.

TABLE 5

Selected properties of wood finish products

| Product[1] | pH | Density (g/cm$^3$) | Viscosity (mPa·s) | Total Solids (wt, %) | VOCs (g/l) |
|---|---|---|---|---|---|
| F0 | 6.29$^f$ | 1.0047$^h$ | 17.76$^g$ | 24.42$^d$ | 148.00 |
| F1 | 6.44$^e$ | 1.0166$^g$ | 60.46$^e$ | 24.51$^d$ | 79.70 |
| F2 | 6.46$^e$ | 1.0186$^f$ | 436.85$^b$ | 24.61$^d$ | 75.48 |
| F3 | 6.61$^d$ | 1.0198$^e$ | 214.45$^c$ | 21.93$^e$ | 59.15 |
| C1 | 7.99$^a$ | 1.0247$^d$ | 143.d$^d$ | 29.37$^b$ | 302 |
| C2 | 7.94$^b$ | 1.0308$^c$ | 497.9$^a$ | 30.43$^a$ | 450 |
| C3 | 7.51$^c$ | 1.0359$^b$ | 51.73$^f$ | 30.02$^{ab}$ | 350 |
| C4 | 7.99$^a$ | 1.0372$^a$ | 213.55$^c$ | 25.53$^c$ | 295 |

[1]Any two means in the same column followed by the same letter are not significantly (P > 0.05) different by Fisher's Protected LSD multiple comparisons.

Density readings show a concurrent increase in density with an increase in the amount of protein dissolved in the solution. It is notable that the density of solution F3 is higher than that of F2, F 1 and F0, even though the total solids content of the solution is less.

The fourth column illustrates the viscosity measurements recorded for each of the eight wood finishing solutions and shows that even the more heavily loaded WPI based solutions are at viscosities within the range of those presented by the commercially available products. Viscosity measurements were made using an AR-1000™ Rheometer (TA Instruments, New Castle, Del.) and results were obtained at a shear rate of 10 s$^{-1}$.

The last column in Table 5, illustrates that the VOC content of the three formulations containing WPI is significantly less than those of the commercially available products. This demonstrates a less toxic, more environmentally sound wood finish solution. Data for VOCs were obtained by calculating the quantity added for those finishes that were compounded and were taken from manufacturer's product data for the commercially available formulations.

Drying time, thickness and two measures of hardness were also measured and recorded for each of the eight formulations. Drying time was determined using a DT-BK3™ Drying Time Recorder (Paul N. Gardner Co., Inc., Pompano Bch., Fla.) and the method used was that of ASTM D5895. Results are provided in Table 6.

TABLE 6

Drying time and hardness of wood finish samples

| Products[1] | Dry-Through Time (min) | Dry Film Thickness (μm) | Gouge Hardness | Scratch Hardness |
|---|---|---|---|---|
| F0 | 83.5$^d$ | 26.16$^d$ | 7H | HB |
| F1 | 31.0$^e$ | 33.91$^b$ | 7H | HB |
| F2 | 18.5$^f$ | 25.53$^d$ | 7H | HB |
| F3 | 86.5$^d$ | 29.97$^c$ | 6H | B |
| C1 | 208.5$^b$ | 32.77$^b$ | 4H | 4B |
| C2 | 262.5$^a$ | 35.52$^a$ | 4H | 4B |
| C3 | 103.5$^c$ | 26.75$^d$ | 4H | 4B |
| C4 | 89.5$^d$ | 28.70$^c$ | 5H | 2B |

[1]Any two means in the same column followed by the same letter are not significantly (P > 0.05) different by Fisher's Protected LSD multiple comparisons It is notable that all of the wood finish solutions containing the WPI component had faster dry time than did the commercially available products and that both F1 and F2 exhibited considerably faster dry times than did the acrylic based coating formulation of F0. These accelerated dry times may be partially accounted for by the lower level of VOCs contained in the WPI compounded samples.

The third column in Table 6 shows that the dry film thickness of the WPI containing formulations were comparable to those of the commercially available products. Dry film thickness was measured with an elcometer® Model 126 Dial Thickness Gage (Paul N. Gardner Co. Inc., Pompano Bch, Fla.). Gauge hardness was evaluated by determining the hardest pencil lead that would leave the film uncut for a stroke of at least 3 millimeters. Scratch hardness is defined as the hardest pencil lead that will not rupture or scratch the film. The apparatus used to record gouge and scratch results was a Scratch Hardness Tester model 3363 available from the Paul N. Gardner Co., Inc., Pompano Bch., Fla. The method employed was ASTM D3363. In order of from softest to hardest the available pencil leads are as follows: 6B, 5B, 4B, 3B, 2B, B, HB, F, H, 2H, 3H, 4H, 5H, 6H, 7H, 8H, 9H.

Both the gauge hardness and scratch hardness results were noticeably better for the formulations containing the whey based proteins than for those of the commercially available products and were comparable to the results obtained for the acrylic based coating, F0.

Additional test were run to evaluate the color values and whiteness index of the wood finishes (Bolin H. R. and Huxsoll, C. C. 1991. *J. Food Sci.* 56:416-8.). Results are provided in Table 7. The second column labeled "L" reflects the color value, with black being equivalent to 0 and white being equivalent to 100. Results were comparable for all formulations from F0 through C4. The third column labeled "a" provides the amount of greenness or redness attributable to the coating. A negative number indicates greenness, a positive number redness. Each of the WPI containing finishes, F1, F2 and F3, showed a slight tendency towards greenness but less so than the acrylic based resin absent the WPI and less than commercially available products C2 and C3. Color measurements were made in triplicate using a HunterLab ColorQuest® Spectrophotometer (HunterLab, Reston, Va.). In the fourth column, "b" represents the blueness or yellowness of the coating. A −b indicates blueness and a +b, yellowness. Each of the WPI containing solutions tended towards yellowness rather than blueness but less so than the acrylic based finish absent the WPI and less than commercial products C2 and C3. The fifth column, labeled "ΔE" was calculated as follows and represents the total color difference.

TABLE 7

Hunter L, a, b color values, total color difference (ΔE), yellowness index (YI), and whiteness index (WI) of wood finish films.

| Products[1] | L | a | b | ΔE | YI | WI |
|---|---|---|---|---|---|---|
| F0 | $92.56^d$ | $-2.75^d$ | $3.31^b$ | $4.23^b$ | $5.11^b$ | $91.40^d$ |
| F1 | $93.07^{ab}$ | $-1.91^c$ | $1.43^d$ | $2.76^d$ | $2.20^d$ | $92.67^{ab}$ |
| F2 | $92.90^{abc}$ | $-1.93^c$ | $1.56^{cd}$ | $2.96^{cd}$ | $2.39^{cd}$ | $92.47^{bc}$ |
| F3 | $92.76^{cd}$ | $-1.97^c$ | $1.78^c$ | $3.14^c$ | $2.74^c$ | $92.29^c$ |
| C1 | $92.56^d$ | $-1.37^a$ | $0.36^f$ | $3.17^c$ | $0.56^f$ | $92.43^{bc}$ |
| C2 | $92.59^d$ | $-2.72^d$ | $3.45^b$ | $4.27^b$ | $5.32^b$ | $91.39^d$ |
| C3 | $92.82^{bcd}$ | $-3.17^e$ | $4.52^a$ | $5.00^a$ | $6.95^a$ | $90.95^e$ |
| C4 | $93.09^a$ | $-1.67^b$ | $0.96^e$ | $2.65^d$ | $1.47^e$ | $92.82^a$ |

[1] Any two means in the same column followed by the same letter are not significantly (P > 0.05) different by Fisher's Protected LSD multiple comparisons.

$$\Delta E = (\Delta L^2 + \Delta a^2 + \Delta b^2)^{0.5} \qquad (1)$$

A yellowness index was calculated as follows:

$$YI = 142.86 \, b/L \qquad (2)$$

The whiteness index was calculated according to:

$$WI = 100 - [(100-L)^2 + a^2 + b^2]^{0.5} \qquad (3)$$

Where $\Delta L = L_{standard} - L_{sample}$; $\Delta a = a_{standard} - a_{sample}$; $\Delta b = b_{standard} - b_{sample}$.

In total, the color values indicate that the addition of the WPI to the acrylic based finish improves the color values and makes them comparable to and better than some of the commercially available products that contain high levels of VOCs.

EXAMPLE 3

The finishes were also evaluated to determine their response to immersion in water. Test were conducted using ASTM method D1647. Coated samples were immersed in water for 18 hours and each experiment was performed in duplicate. Results are provided in Table 8.

TABLE 8

| Results[2] | Wood Finish Products | | | | | | | |
|---|---|---|---|---|---|---|---|---|
| | F0 | F1 | F2 | F3 | C1 | C2 | C3 | C4 |
| Not visibly affected Whitening disappears within 20 min | ⇔ | ⇔ | ⇔ | ⇔ | ⇔ | ⇔ | | |
| Whitening does not disappear within 20 min, but disappears within 2 h | | | | | | | ⇔ | ⇔ |

While each of the finishes tested showed some whitening in response to the exposure to water, the whitening disappeared from the WPI products in less than 20 minutes. Two of the commercially available products, C3 and C4 remained white past the 20 minute period and improved in less than 2 hours. This shows that a wood product coated with the WPI containing finishes can recover faster than, or in an amount of time equivalent to, the commercially available products.

Figure 1:
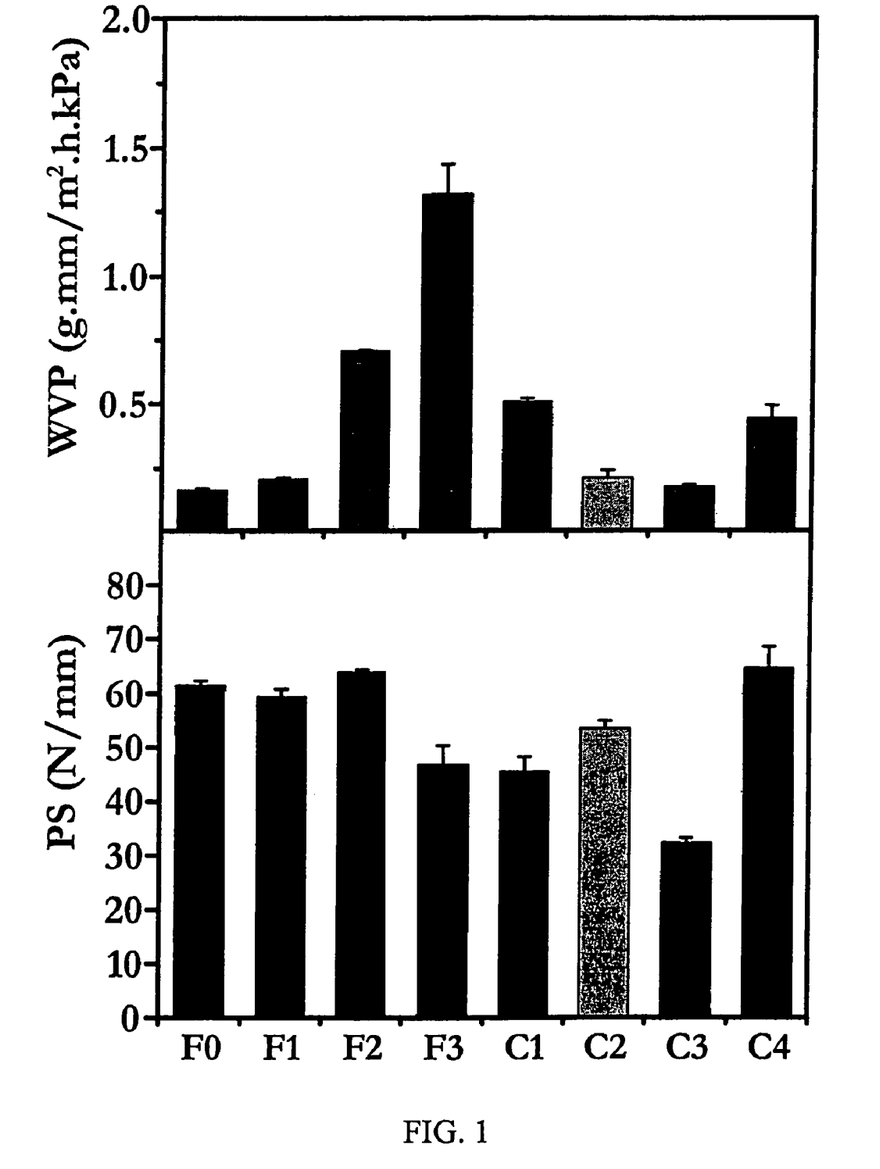
FIG. 1 is a bar graph showing test results from water vapor permeability testing and puncture strength testing.

The products were also evaluated for water vapor permeability as well as for puncture strength. Water vapor permeability was determined according to the WVP Correction Method (McHugh T. H., Averna-Bustillos, R., and Krochta, J. M. 1993. *J. Food Sci.* 58(4):899-903). Puncture strength test was performed using a miniature universal material tester sold as the Vitrodyne® V-1000 from Liveco of Burlington, Vt. Results are presented in FIG. 1. As shown in FIG. 1, water permeability increased as the amount of WPI increased in the wood finish formulation. WPI containing formulation F1 was comparable to or better than the commercially available products but water permeability increased for formulations F2 and F3.

Puncture strength results show that the puncture resistance of the three WPI containing formulations to be equivalent to or better than those of the commercially available products and were not significantly different from the acrylic based resin absent the WPI.

EXAMPLE 4

Another finish was formulated using a two binder component system including an oil modified polyurethane dispersion and denatured whey proteins. Both the finish and the resulting cured coating were evaluated.

The oil modified polyurethane dispersion was SPENSOL™ F97-MPW-33, from Reichhold, Inc., Morris, Ill. The whey protein isolate (WPI) was the same as that used in previous examples, ALACEN® 895 WPI, 93.5% protein content from NZMP (North America), Santa Rosa, Calif. The following additives were also used in the formulations. Surfactant BYK-345, BYK Chemi USA Inc. (Wallingford, Conn.) was employed to improve, for example, recoatability. Rheology modifier, ACRYSOL™ RM-2020 NPR, from Rohm & Haas (Bridgeport, N.J.) was used to improve film buildup and defoamer dispersion. The defoamer used was DREWPLUS™ L-405, Ashland Canada, Inc., and biocide PROXEL® GXL, Avecia Inc. (Willmingon, Del.) served as a preservative. The base control formulation is provided in Table 9. Component quantities were consistent across the test formulations unless otherwise stated.

The oil modified polyurethane dispersion, Spensol F97-MPW 33, was used for its compatibility with water and for its toughness and durability characteristics. Spensol F97-MPW 33 is made up of 60% Water, 33% Polyurethane Resin. 5.0% 1-Methyl-2-Pyrrolidinone (organic solvent used to disperse the urethane in water) and 1.5% N,N-Diethylethanamine (used as a chain extension). As in prior examples, the WPI was made into a 10% protein solution and was denatured by heating at 90° C. for 30 minutes. In each of the formulations, the total solids (TS) were maintained at 21% TS by substituting WPI for resin on a one-to-one solids basis. Thus, as WPI increased in concentration, the amount of polyurethane decreased in concentration.

TABLE 9

| Material Components | Control % |
|---|---|
| Spensol F97-MPW-33 | 91.23 |
| 10% WPI | 0 |
| H$_2$O | 7.84 |
| BYK 345 | 0.153 |
| Acrysol ™ RM-2020 | 0.71 |
| Drewplus L-405 | 0.024 |
| Proxel ® GXL | 0.05 |

The amount of WPI was varied from 0% (control) up to 31.5% of 10% aqueous WPI solution. The pH, specific gravity, density and viscosity for each of seven different formulations are provided in Table 10.

TABLE 10

| Sample (WPI %) | pH-level | Specific Gravity | Density (gm/cm$^3$) | Viscosity (Pa · s) |
|---|---|---|---|---|
| 0% | 8.096 | 1.021 | 1.0162 | 0.393 |
| 10.50% | 8.13 | 1.018 | 1.0172 | 0.182 |
| 13.13% | 8 | 1.016 | 1.0013 | 0.357 |
| 16% | 8 | 1.015 | 0.964 | 0.556 |
| 18.76% | 8 | 1.016 | 1.0183 | 0.776 |
| 21% | 8 | 1.018 | 1.0025 | 0.945 |
| 31.50% | 7.9 | 1.016 | 1.0112 | 6.766 |

Figure 2:
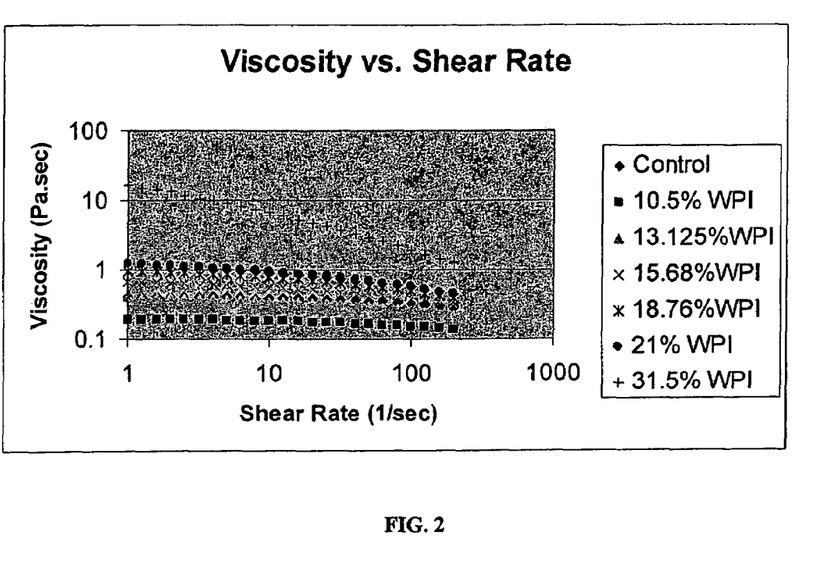
FIG. 2 is a graph showing the relationship between viscosity and shear rate for seven finish formulations containing varying amounts of WPI.

The pH, specific gravity and density varied only slightly, reflecting the compatibility of the formulations and the consistent 21% TS content of each formulation. At 10.5% WPI solution, a notabable drop in viscosity was realized, but at 16% and greater, viscosity increased, presumably due to a reduction in water additive and a reduction in resinous binder. The viscosity of each of these seven formulations at varying shear rates is provided in FIG. 2. At a WPI level of 31.5%, a large increase in viscosity was realized indicating that a free flowing limit would likely be approached at higher levels of WPI.

Formulations having 0, 10.5, 21 and 31.5% WPI were cast onto polystyrene Petri-dishes and conditioned in an environmental chamber at 23±2° C. and 55±5% Relative Humidity (RH) for at least 48 hours. Water vapor permeability (WVP), moisture content (MC), and puncture strength (PS) were determined and are reported in Table 11. Also provided are results for formulations C2 and C4, as described in Example 2 above.

TABLE 11

| WPI Level (%) | WVP (gr · mm/h · m$^2$ · kPa) | MC (%) | PS (N/mm) |
|---|---|---|---|
| Control (0%) | 0.09 | 2.32 | 25.12 |
| 10.5 | 0.16 | 2.7 | 30.52 |
| 21 | 0.48 | 3.15 | 32.16 |
| 31.5 | 0.88 | 4.09 | 34.27 |
| C2-Acrylic Polyurethane | 1.06 | 5.31 | 53.41 |
| C4-Water-based Polyurethane | 1.12 | 5.07 | 64.49 |

As the protein content in the finish increased, the resulting cured coating became more permeable to water vapor. Both WVP and MC, however, were higher for both C2 and C4 (commercial urethane formulations) than for any of the formulations containing WPI. It is believed that the hydrophilicity of the film increases with increasing protein content. Thus, although the WPI formulations exhibited higher WVP and MC than did the control, they were lower than the commercially available acrylic polyurethanes tested. Also, there was a noticeable increase in puncture strength (PS) resulting from increasing WPI concentration.

Drying characteristics were also measured for each of the seven formulations using ASTM Method D5895 and are provided in Table 12. As the WPI concentration increased in successive formulations, the overall water content was reduced. This reduced water content was expected to lead to reduced drying times. Both the "dry hard" and the "dry through" times are provided and show that curing times for the WPI formulations are superior or comparable to those of commercially available non-WPI coatings. Overall, the formulated coatings containing WPI exhibited fast dry hard times and relatively slow dry through times. For example, the dry hard time of the formulation containing 31.5% WPI was less than 30% of the dry hard time for the control containing no WPI.

TABLE 12

| WPI % | Thickness (µm) | Dry hard time (mins) | Dry through time (mins) |
|---|---|---|---|
| Control - no protein | 34.4 | 22 | 268 |
| 10.50 | 23.6 | 16 | 263 |
| 13.13 | 26.2 | 16 | 246 |
| 15.75 | 20.0 | 15 | 254 |
| 18.36 | 38.8 | 13 | 165 |
| 21% | 21.8 | 14 | 196 |
| 31.50% | 17.2 | 6 | 137 |

Hardness measurements for the seven formulations were also tested. These results are provided in Table 13 and show that up to 21% WPI there was no decrease in either gouge hardness or scratch hardness when compared to the polyurethane control. At 31.5% WPI, the gouge hardness and scratch hardness was reduced one level. It is notable that the results show a hardness range equivalent to that of commercial products (oil modified polyurethane) known for hardness and durability.

TABLE 13

| WPI % | Thickness (µm) | Gouge Hardness | Scratch Hardness |
|---|---|---|---|
| Control - no protein | 34.4 | H | F |
| 10.50% | 23.6 | H | F |
| 13.13 | 26.2 | H | F |
| 15.75 | 20.0 | H | F |
| 18.36 | 38.8 | H | F |
| 21% | 21.8 | H | F |
| 31.50% | 17.2 | B | 2B |
| 6B-5B-4B-3B-2B-B-HB-F-H-2H-3H-4H-5H-6H-7H-8H-9H | | | |
| Softer             Harder | | | |

As illustrated by the VOC data in Table 14, the already low VOC content of the water-based resinous binder is reduced even further by combining with WPI in the formulations tested. By incorporating 10.5% of WPI solution, a 34% reduction in VOCs was realized. At a 31.5% WPI solution, the VOCs were reduced by approximately 41%.

TABLE 14

| WPI-% | Resin-% | VOC (gms/L) |
|---|---|---|
| 0 | 91.26 | 185.6 |
| 10.5 | 60.45 | 122.95 |
| 13.13 | 59.66 | 121.34 |
| 15.75 | 58.86 | 119.71 |
| 18.36 | 58.07 | 118.11 |
| 21 | 57.27 | 116.48 |
| 31.5 | 54.09 | 110.01 |

These results indicate that by combining two different polymers, WPI and polyurethane, the positive attributes of both can be incorporated into a single wood finish that provides coating characteristics comparable or better to 100% polyurethane formulation at significantly reduced VOC levels. It is also surprising to see the improvement in puncture strength with an increasing WPI content in the finish formulation.

EXAMPLE 5

In another example, an interior paint finish was produced using whey proteins as a co-binding material. Polymerized whey proteins were incorporated into a paint base formulation to replace a portion of the conventional resin binders that are typically used in paint. Various pigments were added to provide an opaque wood finish. The resulting paint provided a smooth, opaque finish into which a variety of pigments and additives can be added to vary properties such as color, viscosity and gloss. The opaque wood finish was produced as for other finishes described above, except where otherwise indicated. Components, their sources, and their primary function are described in table 15 below.

TABLE 15

Range of use of finish components for interior paint bases

| Ingredient | Supplier | Function | Range of Use (% by wt) |
|---|---|---|---|
| Rovace 9900 | Rohm and Hass, Phila, PA | Binder | 0~35 |
| Rhoplex Multilobe 200 | Rohm and Hass, Phila, PA | Binder | 0~8 |
| Rhoplex SG-10 M | Rohm and Hass, Phila, PA | Binder | 0~80 |
| Polymerized WPI (8.0%) | NZMP (USA) Inc., Lemoyne, PA | Binder | 1~15 |
| Kathon LX 1.5% | Rohm and Hass, Phila, PA | Biocide | 0~0.2 |
| Water | | Carrier/diluent | 10~20 |
| Texanol | Eastman Chemical Company, Kingsport, TN | Coalescent | 1~5 |
| Foamaster VL | Fitz Chem Corporation, Elmhurst, IL | Defoamer | 0.15~0.35 |
| Tamol 1254 | Rohm and Hass, Phila, PA | Dispersant | 0~1.2 |
| Ammonia (29.8%) | Fisher Scientific | pH control | 0~0.2 |
| Ropaque Ultra | Rohm and Hass, Phila, PA | Pigment | 0~6 |
| Ti-Pure R-900 | Rohm and Hass, Phila, PA | Pigment | 0~30 |
| Snowflake P.E. | IMERYS, Roswell, GA | Pigment | 0~25 |
| Optiwhite | Burgess Pigment Company, Sandersville, GA | Pigment | 0~15 |
| Acrysol DR-3 | Rohm and Hass, Phila, PA | Rheology modifier | 0~1.0 |
| Acrysol RM-2020 NPR | Rohm and Hass, Phila, PA | Rheology modifier | 0~1.0 |
| Propylene Glycol | Fisher Scientific | Solvent | 3~5 |
| Triton CF-10 | The Dow Chemical Company, Midland, MI | Surfactant | 0~0.15 |

Four different interior tint bases were produced, varying from white to deep. The amount of various components used in each tint base are provided below in Table 16.

TABLE 16

Interior flat paint base wood finish formulations

| | Amount (% weight) | | | |
|---|---|---|---|---|
| Ingredients | White | Light | Medium | Deep |
| Water | 16.194 | 16.833 | 17.231 | 17.792 |
| Tamol 1254 | 1.087 | 1.090 | 1.048 | 1.003 |
| Foamaster VL | 0.238 | 0.241 | 0.248 | 0.257 |
| Ropaque Ultra | 5.804 | 4.477 | 2.463 | — |
| Rovace 9900 | 20.615 | 20.713 | 22.296 | 24.149 |
| Rhoplex Multilobe 200 | 3.203 | 3.210 | 3.772 | 4.286 |
| Rhoplex SG-10M | — | — | — | — |
| Ti-Pure R-900 | 25.927 | 20 | 11.001 | — |
| Snowflake P.E. | 8.150 | 12.201 | 17.255 | 23.582 |
| Optiwhite | 3.980 | 5.959 | 8.428 | 11.518 |
| Propylene Glycol | 3.314 | 3.316 | 3.379 | 3.448 |
| Texanol | 1.281 | 1.254 | 1.295 | 1.335 |
| Triton CF-10 | 0.107 | 0.109 | 0.106 | 0.105 |
| Kathon LX 1.5% | 0.141 | 0.143 | 0.146 | 0.149 |
| Ammonia (29.8%) | 0.055 | 0.055 | 0.055 | 0.056 |
| Polymerized WPI (8.0%) | 9.387 | 9.917 | 10.836 | 11.931 |
| Acrysol DR-3 | 0.511 | 0.477 | 0.435 | 0.383 |
| Acrysol RM-2020 NPR | 0.004 | 0.004 | 0.004 | 0.005 |
| Total | 100 | 100 | 100 | 100 |

White, light, medium, and deep are four different tint bases.

The pH and viscosity of each of the above paint formulations was measured and recorded. Results are provided below in Table 17. Viscosity values are typically lower than they would be for a commercial paint base, allowing the paint to be spread in a thin film on a Petri dish for analysis. Viscosity can be adjusted for specific applications using various additives known to those skilled in the art.

TABLE 17

Viscosity and pH values for interior flat paint base wood finish formulations

| Paint Base | pH | Viscosity (mPa · s) |
|---|---|---|
| Interior Flat White | 9.06 ± 0.16 | 528.48 ± 124.58 |
| Interior Flat Light | 9.10 ± 0.14 | 522.50 ± 124.31 |
| Interior Medium | 9.06 ± 0.16 | 486.91 ± 125.08 |
| Interior Deep | 8.98 ± 0.18 | 449.43 ± 126.55 |

Each of the paint base wood finishes was cast onto Petri dishes to form paint films that were visually examined. Each of the cast films dried into a smooth cured coating without noticeable cracks or shrinking. Results indicate that these paint formulations will be useful in commercial applications.

EXAMPLE 6

In another example, an exterior paint finish was produced using whey proteins as a co-binding material. Polymerized whey proteins were incorporated into a paint base formulation to replace a portion of the conventional resin binders that are typically used in paint formulated for exterior use. Various pigments were added to provide an opaque wood finish. The resulting paint provided a smooth, opaque finish into which a variety of pigments and additives can be added to vary properties such as color, viscosity and gloss. The opaque wood finish was produced as for other finishes described above, except where otherwise indicated. Components, their sources and their primary function are described in table 18 below.

TABLE 18

Range of use of each ingredient for the exterior paint bases

| Ingredient | Supplier | Function | Range of Use (% by wt) |
|---|---|---|---|
| Rhoplex SG-10M | Rohm and Hass, Phila, PA | Binder | 0~80 |
| Rhoplex Multilobe 200 | Rohm and Hass, Phila, PA | Binder | 0~40 |
| Polymerized WPI (8.0%) | NZMP (USA) Inc., Lemoyne, PA | Binder | 1~15 |
| Acrysol RM-2020 NPR | Rohm and Hass, Phila, PA | Binder | 0~5 |
| Kathon LX 1.5% | Rohm and Hass, Phila, PA | Biocide | 0.5~2 |
| Water | | Carrier/diluent | 10~20 |
| Texanol | Eastman Chemical Company, Kingsport, TN | Coalescent | 1~5 |
| Foamaster VL | Fitz Chem Corporation, Elmhurst, IL | Defoamer | 0.15~0.35 |
| Tamol 731A | Rohm and Hass, Phila, PA | Dispersant | 0~1.5 |
| Ammonia (29.8%) | Fisher Scientific | pH control | 0~0.2 |
| Ropaque Ultra | Rohm and Hass, Phila, PA | Pigment | 0~6 |
| Ti-Pure R-706 | Rohm and Hass, Phila, PA | Pigment | 0~25 |
| Minex 4 | The Cary Co., Addison, IL | Pigment | 0~35 |
| Propylene Glycol | Fisher Scientific | Solvent | 3~5 |
| Triton CF-10 | The Dow Chemical Company, Midland, MI | Surfactant | 0~0.15 |

Different tint bases of exterior paint wood finish formulations were made according to the amounts shown in Table 19, below. The formulations were using techniques described above.

TABLE 19

Exterior flat paint base wood finish formulations.

| | Amount (% weight) | | | |
|---|---|---|---|---|
| Ingredients | White | Light | Medium | Deep |
| Water | 16.521 | 16.581 | 17.105 | 17.664 |
| Tamol 731A | 1.279 | 1.279 | 1.222 | 1.161 |
| Foamaster VL | 0.237 | 0.237 | 0.244 | 0.250 |
| Kathon LX 1.5% | 0.135 | 0.135 | 0.137 | 0.139 |
| Ropaque Ultra | 4.347 | 4.191 | 2.151 | — |
| Rhoplex SG-10M | 3.952 | 3.811 | 1.956 | — |
| Rhoplex Multilobe 200 | 22.446 | 22.577 | 25.782 | 29.164 |
| Ti-Pure R-706 | 19.416 | 18.720 | 9.609 | — |
| Minex 4 | 12.558 | 13.248 | 20.934 | 29.033 |
| Propylene Glycol | 3.324 | 3.324 | 3.378 | 3.434 |
| Texanol | 1.183 | 1.178 | 1.156 | 1.133 |
| Triton CF-10 | 0.089 | 0.089 | 0.086 | 0.083 |
| Ammonia (29.8%) | 0.024 | 0.023 | 0.019 | 0.014 |
| Polymerized WPI (8.0%) | 11.502 | 11.560 | 12.581 | 13.656 |
| Acrysol RM-2020 NPR | 2.986 | 3.047 | 3.642 | 4.269 |
| Total | 100 | 100 | 100 | 100 |

White, light, medium, and deep are four different tint bases.

When cast as films onto Petri dishes, each of the formulations listed in Table 19 developed a smooth even film without noticeable cracking or shrinking. These results indicate that that these formulations will provide commercially acceptable and preferable exterior wood finishes.

EXAMPLE 7

The saponified whey wood treatment solution described in U.S. Pat. No. 5,476,686 (the '686 patent) was duplicated so that its applicability as a wood finishing product could be evaluated. Example 2 of the '686 patent was duplicated using sweet whey powder and acid whey powder as starting material and a 45% caustic soda solution as the alkali for saponification.

The resulting pH for these formulations was about 12.2, making the formulations caustic. A formulation made from the sweet whey powder displayed a brown color and the one from the acid whey powder was not stable, as there was extensive precipitation at room temperature. Furthermore, the color changed from light green to brown overnight. Each of the solutions was watery and exhibited a low viscosity. The total solid content was less than 1.8%, indicating that excessive amounts of the caustic solution would need to be used if a protective coating was to be achieved.

Each of the formulations (sweet and acid) was cast onto a Petri dish in an attempt to form a film. Films could not be formed and a simple powdery deposition layer of solids was observed upon drying. It was also noted that the formulation quickly absorbed moisture at a temperature of 23° C. and a relative humidity of 50%. It is clear that this formulation cannot form a wood finish although it may be used for penetrating wood shavings in order to repel pests. The high pH may be responsible for the repellant activity.

It should be understood that although particular embodiments and examples of the invention have been described in detail for purposes of illustration, various changes and modifications may be made without departing from the scope and spirit of the invention. Accordingly, the invention is not to be limited except as by the appended claims.

We claim:

1. A wood finish solution comprising between 2.8% and 4.2% whey protein by weight, wherein the whey protein is denatured whey protein.

2. The wood finish solution of claim 1, further comprising a synthetic resin.

3. An article comprising the wood finish solution of claim 1 disposed on a wood substrate.

4. The article of claim 3, wherein when the wood finish solution dries on the wood substrate forming a wood finish is formed, and the wood finish comprises a clear film.

5. The article of claim 3, wherein when the wood finish solution dries on the wood substrate a wood finish is formed on the article, and the wood finish comprises an opaque film.

6. The article of claim 5, wherein the opaque film is paint.

7. A wood finish solution consisting of: denatured whey protein, water, and a resin and optionally including one or more of a defoamer, a biocide, a surfactant, a flow-resistant agent, a flattening agent, a plasticizer, a mar-resistant agent, a UV additive, an anti-setting agent, an anti-floating agent, a leveling agent, a glossing agent, a pH control agent, a flatting agent, a rheology modifier, a process control agent, a penetrating agent, a wetting agent, a stabilizing agent, a coalescer, and a pigment.

8. The solution of claim 7, wherein the pH of the solution is less than 9.

9. The solution of claim 7, wherein the whey protein comprises non-saponified protein.

10. The solution of claim 7, wherein the whey protein comprises thermally denatured protein.

11. The solution of claim 7, comprising less than 50%, by volume, of VOCs.

12. The wood finish solution of claim 7, wherein the resin is selected from acrylic resins, urethane resins, and mixtures thereof.

13. The wood finish solution of claim 1, further comprising a resin.

14. The wood finish solution of claim 1, wherein the resin is selected from acrylic resins, urethane resins, and mixtures thereof.

15. The wood finish solution of claim 1, wherein the whey protein is non-saponified.

16. The wood finish solution of claim 1, wherein the pH of the solution is less than 9.

17. The wood finish solution of claim 1, wherein the solution comprises less than 50% by volume of VOCs.

18. The article of claim 5, wherein the opaque film is a colored film.

19. A wood finish solution comprising more than zero and up to 3.15% whey protein by weight, wherein the whey protein is denatured whey protein.

20. The wood finish solution of claim 19, further comprising a synthetic resin.

21. An article comprising the wood finish solution of claim 19, disposed on a wood substrate.

22. The article of claim 21, wherein when the wood finish solution dries on the wood substrate the resulting wood finish comprises a clear film.

23. The article of claim 21, wherein when the wood finish solution dries on the wood substrate the resulting wood finish comprises an opaque film.

24. The article of claim 23, wherein the opaque film is paint.

25. The article of claim 23, wherein the opaque film is a colored film.

26. The wood finish solution of claim 19, further comprising a resin.

27. The wood finish solution of claim 26, wherein the resin is selected from acrylic resins, urethane resins, and mixtures thereof.

28. The wood finish solution of claim 19, wherein the whey protein is non-saponified.

29. The wood finish solution of claim 19, wherein the pH of the solution is less than 9.

30. The wood finish solution of claim 19, wherein the solution comprises less than 50% by volume of VOCs.

31. The wood finish solution of claim 7, wherein the solution comprises between 2.8% and 4.2% whey protein by weight.

32. The wood finish solution of claim 7, wherein comprising more than zero and up to 3.15% whey protein by weight.

33. An article comprising the wood finish solution of claim 7, disposed on a wood substrate.

34. The article of claim 33, wherein when the wood finish solution dries on the wood substrate the resulting wood finish comprises a clear film.

35. The article of claim 33, wherein when the wood finish solution dries on the wood substrate the resulting wood finish comprises an opaque film.

36. The article of claim 35, wherein the opaque film is a colored film.

37. The article of claim 35, wherein the opaque film is paint.

38. The wood finish solution of claim 7, wherein the resin is selected from acrylic resins, urethane resins, and mixtures thereof.

39. A method comprising:
  denaturing a whey protein to produce a denatured whey protein; and
  mixing the denatured whey protein with water and a resin to produce a wood finish solution,
  wherein the wood finish solution comprises more than zero and up to 3.15% denatured whey protein by weight.

40. The method of claim 39, wherein the wood finish solution optionally further comprises one or more of a defoamer, a biocide, a surfactant, a flow-resistant agent, a flattening agent, a plasticizer, a mar-resistant agent, a UV additive, an anti-setting agent, an anti-floating agent, a leveling agent, a glossing agent, a pH control agent, a flatting agent, a rheology modifier, a process control agent, a penetrating agent, a wetting agent, a stabilizing agent, a coalescer, and a pigment.

41. A method comprising;
  denaturing a whey protein to produce a denatured whey protein; and
  mixing the denatured whey protein with water and a resin to produce a wood finish solution,
  wherein the wood finish solution comprises between 2.8% and 4.2% denatured whey protein by weight.

42. The method of claim 41, wherein the wood finish solution optionally further comprises one or more of a defoamer, a biocide, a surfactant, a flow-resistant agent, a flattening agent, a plasticizer, a mar-resistant agent, a UV additive, an anti-setting agent, an anti-floating agent, a leveling agent, a glossing agent, a pH control agent, a flatting agent, a rheology modifier, a process control agent, a penetrating agent, a wetting agent, a stabilizing agent, a coalescer, and a pigment.

43. A method of applying the wood finish solution of any one of claims 1, 7, and 19 to an article, comprising applying a coat of the wood finish solution to the article by brush, by spraying, or by dipping.

44. The method of claim 43, further comprising applying one or more subsequent coats of the wood finish solution to the article, wherein optionally the article is sanded between coats.

* * * * *